Nov. 14, 1933.    R. K. LEE    1,934,931
STEERING WHEEL
Filed May 28, 1931

INVENTOR.
ROGER K. LEE.
BY
ATTORNEY

UNITED STATES PATENT OFFICE 1,934,931

STEERING WHEEL

Roger K. Lee, Highland Park, Mich., assignor to Chrysler Corporation, Highland Park, Mich., a corporation of Delaware Application May 28, 1931. Serial No. 540,705

2 Claims. (Cl. 74—33)

This invention relates to an improved steering wheel structure.

The main objects of the invention are to provide a steering wheel structure which includes substantially tubular rim and spoke portions that may be formed of sheet metal; to provide a structure of this character having tubular spokes that are welded to the surrounding rim; to provide an enlarged head on the outer end of each spoke which has a contour that conforms with the curvature of the inner peripheral portion of the rim; to provide a tubular rim which has portions of its inner peripheral wall severed at spaced locations and depressed inwardly so as to form recesses for receiving the enlarged head ends of the spokes; and to provide depressed peripheral wall portions of this character which are adapted to align the edges of the enlarged head ends of the spokes with the corresponding sides of the recesses so as to enable the formation of smooth and rigid joints between the rim and spokes.

Further objects of the invention are to provide an improved hub structure in a steering wheel of this character; to provide means on the hub structure which are in radial alignment with the recesses of the rim and to which the inner ends of the spokes may be conveniently secured by welding operations; to provide passages in the inner ends of the spokes through which welding tools may be inserted so as to bring the tools into contact with the protruding elements of the hub structure; to provide a shell for surrounding the hub structure and concealing the welded joints between the hub structure and the spokes so as to permit the employment of inexpensive assembling operations and to eliminate the necessity of finishing the central portion of the wheel from which the spokes radiate; and to provide a shell of this kind which is adapted to be held against displacement by the member which retains the steering wheel on the steering column with which it is associated when installed.

An illustrative embodiment of the invention is shown in the accompanying drawing, in which:

Fig. 1 is a top plan view, partly in section, of a steering wheel that embodies the invention.

Fig. 2 is a vertical section taken on the line 2—2 of Fig. 1.

Fig. 3 is a fragmentary perspective view of a portion of the rim of the steering wheel to which a spoke is joined during assembly.

Fig. 4 is a fragmentary perspective view of the outer end portion of a spoke showing the enlarged head end portion thereof in detail.

In the form shown in the drawing, my improved steering wheel includes a central hub structure 1 which preferably comprises cast metal and which has a tapered central passage 2 for receiving a steering column 3. The steering column 3 extends beyond the upper extremity of the hub and is provided at its upper end with threads 4. Integrally formed on the sides of the hub 1 are radially projecting elements 5 which are preferably arcuate in shape. These elements may be formed to a semi-cylindrical contour, if desired.

A tubular rim 6 which is preferably formed from sheet metal, concentrically surrounds the hub 1 and is rigidly attached thereto by spokes 7. The spokes 7 are substantially tubular in shape though the edges of the sheet metal of which they are formed do not abut each other throughout the lengths of the spokes. The edges of the sheet metal substantially abut at the outer extremity of the spokes and diverge outwardly toward the inner ends thereof forming a tapered slot in the lower side of the spokes and providing a gradually tapering contour. Formed on the outer extremity of the spokes 7 are enlarged head ends 8 having flared sides and arcuate edge portions 9 which conform with the curvature of the inner peripheral wall of the rim 6. The enlarged heads of the spokes are received in recesses 11 in the inner peripheral wall portion of the rim 6 which are formed by slotting the inner peripheral wall of the rim at spaced locations, indicated at 12 and 13, and depressing that portion of the wall of the rim which is located between the slots, as illustrated in Fig. 3. The depressed wall portions of the rim serve as a stop for receiving the straight edge portions 14 of the heads 8 of the spokes so as to accurately position the arcuate edges 9 thereof in alignment with the sides of the slots 12 and 13. The registering edge portions of the rim and heads of the spokes are then welded together in any conventional manner.

The inner end portions of the spokes 7 have protruding portions 15 which are seated on the radial extending elements 5 of the hub 1 and they are provided on their lower sides with recesses 16 which register with the protruding portions 15 and through which a welding tool, such as an electrode of an electric welding device, may be conveniently inserted so as to enable welding together of the radially extending elements 5 of the hub and the protruding portions 15 of the spokes. Formed in the protruding portions 15 of the of the inner ends of the spokes are apertures 15'. The metal of the radial arms 5 which register with the aperture 15' is fused to the metal at the edges of the apertures, preferably by directing an arc from a welding device through the apertures.

The entire central portion of the steering wheel is inclosed within a shell 17 having a central opening 18 in its upper wall through which the threaded end 4 of the steering post extends. The shell 17 includes a peripheral wall portion 19 in which are formed spaced slots 20 for receiving the spokes 7. Formed at the lower edge of the peripheral wall 19 is an inwardly extending lip or flange 21. The shell 17 may be permanently welded to the hub, but it is preferably detachably held against displacement from the steering wheel by a nut 22 threaded on the upper end portion of the steering column which also serves to hold the steering wheel against displacement from its steering column. The shell 17 is relied upon to conceal the junctions, or welded joints between the hub structure and spokes. With this construction, the joints may be economically formed in a relatively rough manner and they need not be finished for the shell 17 effectively conceals the underlying hub structure.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. A steering wheel including a tubular rim having its inner peripheral wall slotted at spaced locations and depressed inwardly therebetween providing a recess, a central hub, and a spoke secured at one end to said hub having a flange on its outer extremity conforming with the curvature of said rim and inlaid in said recess, the outer surfaces of the edge portions of said flange being substantially flush with the outer surface of said rim and welded to the edge portions of said recess.

2. A steering wheel including a tubular rim having a curvilinear wall structure and having a portion of its inner peripheral wall severed at spaced locations and depressed inwardly providing a recess, a central hub, and a spoke secured to said hub having an enlarged head seated in said recess, the contour of said head conforming with the contour of the wall of said rim and the adjacent edges of said recess and head being welded together.

ROGER K. LEE.